United States Patent
Lang et al.

(10) Patent No.: US 9,758,383 B2
(45) Date of Patent: Sep. 12, 2017

(54) PROCESS FOR THE PREPARATION OF HEXACHLORODISILANE BY CLEAVAGE OF HIGHER POLYCHLOROSILANES SUCH AS OCTACHLOROTRISILANE

(71) Applicants: Juergen Erwin Lang, Karlsruhe (DE); Hartwig Rauleder, Rheinfelden (DE); Ekkehard Mueh, Rheinfelden (DE)

(72) Inventors: Juergen Erwin Lang, Karlsruhe (DE); Hartwig Rauleder, Rheinfelden (DE); Ekkehard Mueh, Rheinfelden (DE)

(73) Assignee: Evonik Degussa GmbH, Essen (DE)

( * ) Notice: Subject to any disclaimer, the term of this patent is extended or adjusted under 35 U.S.C. 154(b) by 21 days.

(21) Appl. No.: 14/782,433

(22) PCT Filed: Feb. 28, 2014

(86) PCT No.: PCT/EP2014/053916
§ 371 (c)(1),
(2) Date: Oct. 5, 2015

(87) PCT Pub. No.: WO2014/173566
PCT Pub. Date: Oct. 30, 2014

(65) Prior Publication Data
US 2016/0060126 A1 Mar. 3, 2016

(30) Foreign Application Priority Data
Apr. 24, 2013 (DE) .......... 10 2013 207 441

(51) Int. Cl.
*C01B 33/107* (2006.01)
*B01J 19/08* (2006.01)

(52) U.S. Cl.
CPC .......... *C01B 33/107* (2013.01); *B01J 19/088* (2013.01); *C01B 33/10742* (2013.01); *C01B 33/10773* (2013.01); *B01J 2219/0805* (2013.01)

(58) Field of Classification Search
CPC B01J 2219/0805; B01J 19/088; C01B 33/107
USPC .............. 423/341, 342; 201/157.44, 157.45, 201/157.48
See application file for complete search history.

(56) References Cited

U.S. PATENT DOCUMENTS

| | | | |
|---|---|---|---|
| 4,374,182 A | | 2/1983 | Gaul et al. |
| 4,559,289 A | * | 12/1985 | Sunagawa .......... G03G 5/08221 430/57.4 |
| 4,568,437 A | * | 2/1986 | Dickson, Jr. ............ C01B 33/04 204/164 |
| 4,721,664 A | * | 1/1988 | Shimizu .................. C23C 16/24 136/258 |
| 4,861,574 A | * | 8/1989 | Ikeda .................... C01B 33/107 423/341 |
| 2003/0147798 A1 | * | 8/2003 | Kirii ...................... C01B 33/03 423/342 |
| 2010/0034722 A1 | | 2/2010 | Ishii et al. |
| 2010/0080746 A1 | | 4/2010 | Lang et al. |
| 2012/0107190 A1 | | 5/2012 | Ishii et al. |
| 2012/0207661 A1 | | 8/2012 | Ishii et al. |
| 2012/0308464 A1 | * | 12/2012 | Bauch ................... C08G 77/60 423/342 |
| 2013/0017138 A1 | | 1/2013 | Auner et al. |
| 2013/0043893 A1 | | 2/2013 | Mueh et al. |
| 2013/0294995 A1 | * | 11/2013 | Mueh .................. C01B 33/043 423/342 |
| 2014/0178284 A1 | | 6/2014 | Lang et al. |

FOREIGN PATENT DOCUMENTS

| | | |
|---|---|---|
| DE | 31 26 240 C2 | 9/1983 |
| DE | 10 2007 007 874 | 8/2008 |
| DE | 10 2009 056 438 | 6/2011 |
| DE | 10 2010 002 342 A1 | 8/2011 |
| EP | 2 151 416 | 2/2010 |
| WO | WO 02/12122 A1 | 2/2002 |
| WO | WO 2008/098640 A2 | 8/2008 |
| WO | 2011 103941 | 9/2011 |
| WO | 2013 007426 | 1/2013 |
| WO | 2014 173567 | 10/2014 |
| WO | 2014 173569 | 10/2014 |
| WO | 2014 173573 | 10/2014 |
| WO | 2014 173574 | 10/2014 |

OTHER PUBLICATIONS

"Building on Success from Our Production of Ultra-High Purity Hexachlorodisilane (HCDS)", ALD Conference Flyer, Nova-Kem, LLC., (Jun. 1, 2012),Total 1 Page, XP055108421.
International Search Report Issued Apr. 3, 2014 in PCT/EP14/053916 Filed Feb. 28, 2014.

* cited by examiner

*Primary Examiner* — Ngoc-Yen Nguyen
(74) *Attorney, Agent, or Firm* — Oblon, McClelland, Maier & Neustadt, L.L.P.

(57) ABSTRACT

The invention relates to a process for converting polychlorosilanes into hexachlorodisilane, by one or more trimeric polychlorosilanes or a trimeric polychlorosilane in a mixture with higher molecular weight polychlorosilanes being exposed to a gas discharge and hexachlorodisilane being formed and isolated.

10 Claims, 1 Drawing Sheet

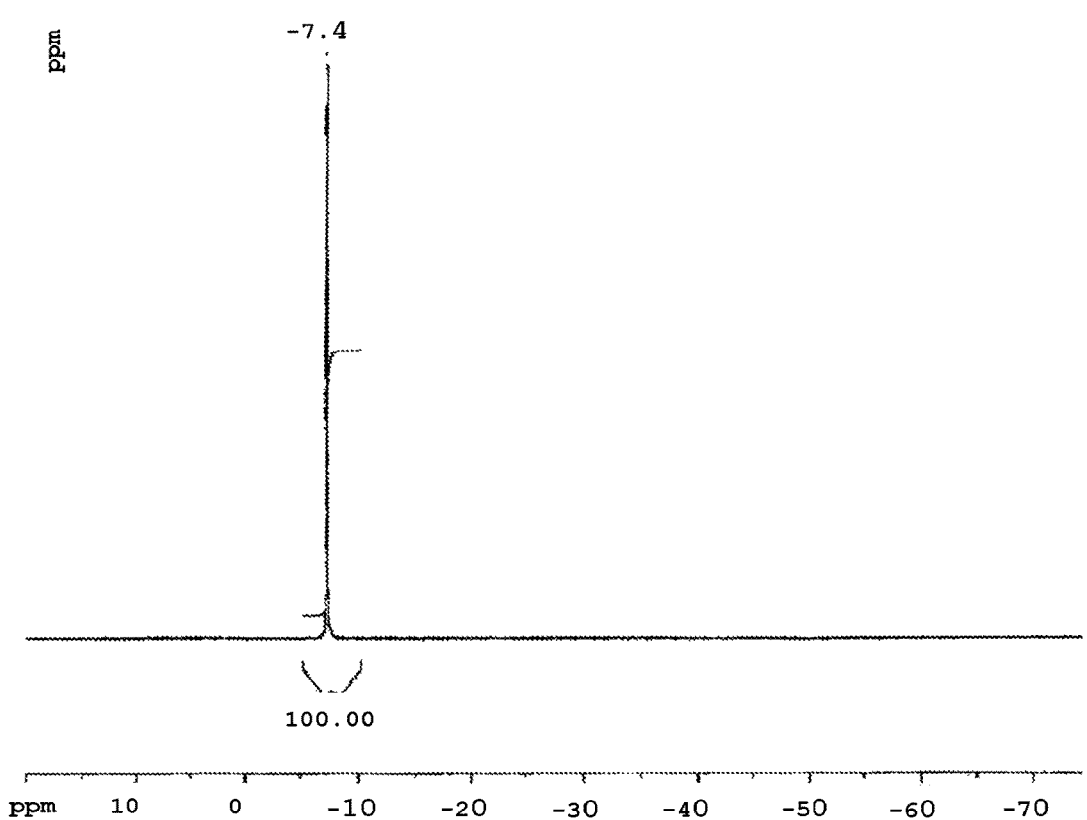

PROCESS FOR THE PREPARATION OF HEXACHLORODISILANE BY CLEAVAGE OF HIGHER POLYCHLOROSILANES SUCH AS OCTACHLOROTRISILANE

The invention relates to a process for converting polychlorosilanes into hexachlorodisilane, by one or more trimeric polychlorosilanes or a trimeric polychlorosilane in a mixture with higher molecular weight polychlorosilanes being exposed to a gas discharge and hexachlorodisilane being formed and isolated.

WO 2008/098640 discloses a process for producing high-order silanes from silicon tetrachloride and hydrogen-containing silanes, such as trichlorosilane, in a plasma reactor. This process does afford hexachlorodisilane in a high yield, but also by-produces octachlorotrisilane (OCTS, $Si_3Cl_8$), which hitherto had to be disposed of at some cost and inconvenience.

DE 3126240 A1 discloses a high-temperature decomposition of polychlorosilanes, defined as having a molecular weight higher than that of hexachlorodisilane, in an inert atmosphere or in a vacuum, at temperatures of 500 to 1450°, to deposit silicon.

WO 20002012122 discloses the deposition of hexachlorodisilane out of exhaust gases from the production of polycrystalline silicon.

One problem with the thermal production of hexachlorodisilane are the likewise formed higher polychlorosilanes, such as $Si_4Cl_{10}$ or higher molecular weight polychlorosilanes, since they are a waste stream which has to be disposed of at some cost and inconvenience. Especially partially oxidized and/or partially hydrolysed derivatives, such as hexachlorodisiloxane, are flammable and impact-sensitive and also explosive. Their formation and handling thus significantly adds to the costs for safeguarding the plants and hence to the operating costs.

US2002/0187096 relates to the formation of silicon from trichlorosilane in the presence of hydrogen to form tetrachlorosilane and a disilane which is decomposed into monosilane at high temperatures between 600 and 1200° C.

Various classes of polysilane compounds are of interest herein, namely the homologous series $Si_nCl_{2n+2}$, which is chain forming, and also the polysilanes which form rings or polymers with $Si_nCl_{2n}$, but also the silicon chlorides of lower chlorine content such as $SiCl_{1.5}$.

What is common to all these processes is that none of them is a large scale industrial method of making hexachlorodisilane, since they concern either collected by-products of silicon deposition, or non-isolatable intermediates, or chlorosilanes badly contaminated with carbon or metals, such as titanium chloride, aluminium chloride.

It is an object of the present invention to develop an economical process for splitting polychlorosilanes which makes it possible to effect a splitting reaction without a catalyst at comparatively low temperatures, preferably under essentially nonthermal conditions, and at the same time provides preferably high-purity hexachlorodisilane. The hexachlorodisilane thus obtained shall be ultrapure, especially with regard to contamination with boron, phosphorus, carbon and/or foreign metals. What is desired is a hexachlorodisilane where the overall content of the impurities mentioned is not more than 100 weight ppm, preferably not more than 75 weight ppm.

This object is solved by the process according to the present invention, the hexachlorodisilane obtained according to the present invention and also by the use according to the present invention as defined by the features of claims 1, 14 and 15.

It was found that, surprisingly, octachlorotrisilane (OCTS) is selectively splittable into hexachlorodisilane (HCDS) and trichlorosilane under the conditions of a gas discharge, in particular in nonthermal plasma, in the presence of HCl. In idealized form, the conversion can be represented by the following equation:

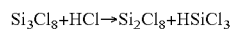

$$Si_3Cl_8 + HCl \rightarrow Si_2Cl_8 + HSiCl_3$$

The conversion products of the gas discharge are condensed, and hexachlorodisilane (HCDS) can be obtained in ultrapure form by distillation.

The invention thus provides a process for converting polychlorosilanes, in particular polychlorosilanes comprising octachlorotrisilane, into hexachlorodisilane, wherein the hexachlorodisilane is preferably obtainable in a purity of not less than 99.9 wt %, more preferably following a distillative work-up of the conversion or splitting products obtained. The polychlorosilane preferably has a carbon content of less than 10 ppm, preferably a carbon content below the detection limit of the ICP-MS, ICP-OES or 29Si NMR spectroscopy customarily used for detecting carbon. The polychlorosilane has a hereinbelow recited content of impurities, in particular selected from boron, phosphorus and foreign metals, of below 100 weight ppm.

The invention further provides a process for converting polychlorosilane into hexachlorodisilane and also a hexachlorodisilane obtainable by this process, by one or more trimeric polychlorosilanes, in particular a gaseous trimeric polychlorosilane, or a trimeric polychlorosilane in a mixture with higher molecular weight polychlorosilanes, in particular gaseous, being exposed to a gas discharge, in particular a nonthermal plasma, and hexachlorodisilane being obtained, preferably the conversion takes place in the presence of hydrogen chloride, more preferably with an excess of trimeric polychlorosilane relative to the hydrogen chloride, for example with a ratio ranging from about 2:1 to approximately an equimolar ratio of trimeric polysilane and hydrogen chloride. It is further preferable for the polysilane to be converted in the nonthermal plasma in the presence of hydrogen chloride to be first transferred into the gas phase.

A polychlorosilane is
a) a trimeric polychlorosilane or, synonymously, chlorotrisilane, in particular a pure chlorotrisilane having less than 100 weight ppm of impurities up to the detection limit or up to 0.001 weight ppt, and/or preferably a polychlorosilane having a chlorotrisilane content of 10 up to 100 wt %, as between 10 to 99.999999%, in particular 20 to 100 wt %, more preferably 25 to 100 wt %, even more preferably 25 to 99.9 wt %; wherein the polychlorosilane is preferably pure octachlorotrisilane having an octachlorotrisilane content of above 91 wt % up to 100 wt %, preferably with 95 to 99.999999 wt %; and/or
b) a mixture comprising a trimeric polychlorosilane and a mixture of higher molecular weight polychlorosilanes, such as chlorosilanes selected from chlorodisilanes, chlorotrisilanes, in particular octachlorotrisilane, chlorotetrasilanes, chloropentasilanes, chlorohexasilanes and also higher molecular weight chlorosilanes having more than seven silicon atoms, wherein the chlorosilanes can have a linear, branched or else cyclic construction. Perchlorosilanes are preferred, the level of hexachlorodisilane in the mixture of higher molecular weight polychlorosilanes preferably being below 10 wt % down to 0.000001 wt %.

The aforementioned chlorosilanes, in addition to chlorine substituents, generally further comprise hydrogen, for example $H_m\cdot Si_n\cdot Cl_{(2e+2)-m^*}$ and/or $H_m\cdot Si_n\cdot Cl_{(2n^*)-m^*}$, with in each case independently n* not less than 2, in particular n* not less than 2 to 20, and/or in each case independently with m* not less than 1, in particular with m* not less than 1 to 10.

Particularly preferred polychlorosilanes are compounds of general formula I $$Si_n Cl_{2n+2}, \qquad \text{I}$$

with n not less than 2, in particular with n not less than 2 to 100, preferably with n not less than 2 to 50, more preferably with n not less than 2 to 10, while they can also form linear as well as branched chains, and compounds of general formula II, which form rings or polymers:

$$Si_n Cl_{2n}, \qquad \text{II}$$

with n not less than 3, in particular with n not less than 4 to 100, in particular with n not less than 4 to 50, more preferably with n not less than 4 to 10, but also polychlorosilanes with lower chlorine content as per general formula III $$Si_n Cl_{1.5n}, \qquad \text{III}$$

with n not less than 4 or 5, in particular with n not less than 6 to 200, preferably with n not less than 8 to 100.

It is an immense advantage of the process according to the present invention that these mixtures can be fed into the plasma without prior purification through distillative removal of individual compounds.

Higher molecular weight polychlorosilanes are with particular preference any polychlorosilanes having more than three silicon atoms, as with n not less than 4, in particular with n not less than 4 to 200 according to formulae I, II and/or III. Likewise preferred higher molecular weight polychlorosilanes comprise polychlorosilanes having more than three silicon atoms and have a hexachlorodisilane content of below 10 wt % down to 0.000001 wt %.

A trimeric polychlorosilane is any polychlorosilane having three silicon atoms each directly bonded to one another covalently via a single bond, such as a chlorotrisilane, i.e. according to formulae I or II with n equal to 3, such as $Cl_3Si$—$SiCl_2$—$SiCl_3$, and at least one chlorine substituent, while the remaining free valencies are saturated with hydrogen or bromine, preferably with hydrogen. It is particularly preferable according to the present invention for a trimeric polychlorosilane, such as a chlorotrisilane, to be an octachlorotrisilane (OCTS).

It is particularly preferable for the polychlorosilane used in the process of the present invention to be a high-purity polychlorosilane having less than 100 weight ppm of impurities in the polychlorosilane and preferably having a polychlorosilane content of not less than 99.99 wt %, the impurities amounting in total to less than 100 weight ppm of one, two or more or all elements selected from boron, phosphorus, carbon and foreign metals, in particular boron, phosphorus, carbon, aluminium, calcium, iron, nickel, titanium and zinc. It is further preferable for the polychlorosilane used in the process according to the present invention to be a polyperchlorosilane, preferably a high-purity polyperchlorosilane having less than 100 weight ppm down to the detection limit or down to 0.001 weight ppt of impurities, as defined hereinbelow.

The abovementioned impurities are measured by one skilled in the art using ICP-MS, ICP-OES, or 29Si NMR spectroscopy. Since, however, the detection limits of such methods are occasionally insufficient, an alternative method is also employed, and it is described in DE 10 2010 002 342 A1. The disclosure content of this application for a patent is expressly incorporated herein by reference.

The method determines impurities due to foreign atoms not directly, but indirectly by measuring a physical property of a silicon layer formed from the silanes in question, namely the specific resistance which is well defined among those skilled in the art.

When, in accordance with the present invention, a silicon layer is formed in a deposition process from the silane or silanes used as precursor or mixture of presursors, the impurities turn up as foreign atoms in the layer of silicon. These release charge carriers and/or free them out of the silicon host lattice of the silicon layer and thus influence the specific resistance. But the density of the charge carriers is very largely uniquely dependent on the concentration of the foreign atoms. The level of impurities in the silane or silanes can therefore be inferred from the measured value of the specific resistance in the silicon layer.

The spreading resistance profiling (SRP) method is used to measure the resistance and the layer thickness. In SRP, the silicon layer in question is formed on a substrate, for example a commercially available silicon wafer which has been prepared in a defined manner, and a piece of the coated substrate is beveled down to the substrate at a defined angle to form a profile.

The resistance measurement is carried out on this profile as a function of the layer thickness using two probe tips, which scan the entire profile at certain intervals and report a resistance value in each case. The bevel angle and the path length can also be used to compute the layer thickness. This method of measurement is described in detail in several standards and stipulates the procedure described above. For the method of measurement, a person skilled in the art proceeds for example in accordance with the SEMI standards MF672 and MF674, or the ASTM F 672-80 standard.

It is particularly preferred for the process according to the present invention to use a polychlorosilane, PCS for short, in particular octachlorotrisilane or an octachlorotrisilane in a mixture with higher molecular weight polychlorosilanes, preferably polyperchlorosilanes, in which case the polychlorosilane has an octachlorotrisilane content between 20 to 99.9999 wt %, preferably an octachlorotrisilane content of 91 to 99.9999999 wt %, which has the following impurity profile with respect to one, two or more or all of the elements hereinbelow. If it has this impurity profile, the polychlorosilane shall be referred to in the context of the invention as "high-purity polychlorosilane":

a. aluminium below 5 weight ppm or
   from 5 weight ppm to 0.0001 weight ppt,
   preferably from 3 weight ppm to 0.0001 weight ppt, and/or
b. boron below 10 weight ppm or
   from 10 weight ppm to 0.0001 weight ppt,
   preferably from 5 to 0.0001 weight ppt,
   more preferably from 3 weight ppm to 0.0001 weight ppt, and/or
c. calcium below 2 weight ppm,
   preferably from 2 weight ppm to 0.0001 weight ppt, and/or
d. iron not more than 20 weight ppm,
   preferably from 10 weight ppm to 0.0001 weight ppt, more preferably from 0.6 weight ppm to 0.0001 weight ppt, and/or
e. nickel not more than 10 weight ppm,
preferably from 5 weight ppm to 0.0001 weight ppt,
more preferably from 0.5 weight ppm to 0.0001 weight ppt, and/or
f. phosphorus below 10 weight ppm,
preferably from 10 weight ppm to 0.0001 weight ppt,
more preferably from 5 weight ppm to 0.0001 weight ppt,
even more preferably from 3 weight ppm to 0.0001 weight ppt, and/or
g. titanium not more than 2 weight ppm,
preferably from 1 weight ppm to 0.0001 weight ppt,
more preferably from 0.6 weight ppm to 0.0001 weight ppt,
even more preferably from 0.1 weight ppm to 0.0001 weight ppt, and/or
h. zinc not more than 3 weight ppm,
preferably from 1 weight ppm to 0.0001 weight ppt,
more preferably from 0.3 weight ppm to 0.0001 weight ppt, and
i. carbon, with the proviso that carbon is present in a concentration which is added to the sum total of impurities a. to h. The value thus obtained is less than 100 weight ppm. This value is preferably from 100 weight ppm to 0.001 weight ppt, more preferably less than 50 weight ppm, more preferably from 50 weight ppm to 0.001 weight ppt, even more preferably from 10 weight ppm to 0.001 weight ppt, yet even more preferably less than 5 weight ppm and yet still even more preferably from 5 weight ppm to 0.001 weight ppt.

In addition to the aforementioned features, it is further preferable for the practice of the process that the gas discharge should be a nonthermal plasma and more preferable that the gas discharge should take place in an ozonizer. The gas discharge in the plasma can be carried out with or without at least one inert gas or carrier gas.

It can further be advantageous to use an inert gas, such as argon or some other customary inert gas, to augment the vaporization of the polychlorosilane.

In a similarly preferred embodiment of the process according to the present invention, at least one trimeric polychlorosilane, preferably octachlorotrisilane, or the trimeric polychlorosilane, especially octachlorotrisilane, in a mixture with higher molecular weight polychlorosilanes, especially perchlorosilanes and/or hydrogen- and chlorine-substituted polychlorosilanes, is exposed to a gas discharge in the presence of hydrogen chloride. It is particularly preferable here for the conversion to be effected with a high-purity hydrogen chloride gas which preferably has impurities comprising foreign elements or foreign molecules at below 100 weight ppm down to 1 weight ppb, in particular below 100 weight ppb down to 1 weight ppb.

Foreign elements/molecules are any chemical elements, salts and molecules not in correspondence with hydrogen chloride.

It is further preferable for the reaction to be carried out in a vacuum, in particular at a pressure of below 1 $bar_{abs}$, preferably between $10^{-3}$ to 1000 $mbar_{abs}$, more preferably between 1 to 1000 $mbar_{abs}$, further preferably between 1 to 500 $mbar_{abs}$, preferably between 10 to 200 $mbar_{abs}$, more preferably between 10 to 100 $mbar_{abs}$, better at around 50 $mbar_{abs}$ plus/minus 10 $mbar_{abs}$.

In a further particularly preferred embodiment of the process according to the invention, the polychlorosilane used is a high-purity polychlorosilane, preferably having a polychlorosilane content of 98 to 99.9999 wt %, and in particular an impurity content of less than 2 wt %, preferably less than 100 weight ppm. It is further preferable here for the high-purity polychlorosilane used to be an octachlorotrisilane having an octachlorotrisilane content of 80 to 99.9999 wt %, especially a high-purity octachlorotrisilane, preferably having less than 100 weight ppm of impurities. Impurities are any chemical elements, molecules or ions not in correspondence with a polychlorosilane.

The invention likewise provides that the polychlorosilane used in the process comes from a reaction of tetrachlorosilane with hydrogen in a nonthermal plasma or of tetrachlorosilane with methyltrichlorosilane and was distillatively separated from disilane and monosilane compounds. Preferably, the polychlorosilane is a bottom product of the distillation of the reaction product from the reaction of tetrachlorosilane with hydrogen or from the reaction of tetrachlorosilane with methyltrichlorosilane in a nonthermal plasma, in particular after the distillative separation from disilane and monosilane compounds. Preferably, the by-produced OCTS according to the disclosure of WO 2008/098640 is separated off batchwise by vacuum distillation in a first purifying step of the process disclosed therein, thereafter the polychlorosilane obtained (comprising octachlorotrisilane and/or higher molecular weight polychlorosilanes) is transferred into the gas phase in a vacuum and mixed with a hydrogen chloride stream, the entire gas stream obtained (comprising polychlorosilane (PCS) and hydrogen chloride gas) is exposed to the gas discharge, especially the nonthermal plasma.

The process of the present invention may thus preferably comprise the steps of:
1) reacting tetrachlorosilane with hydrogen in a nonthermal plasma,
2) distillatively removing disilane and monosilane compounds to obtain polychlorosilanes as bottom product,
3) converting the polysilanes in the presence of hydrogen chloride in the nonthermal plasma to obtain hexachlorodisilane, in particular isolation of hexachlorodisilane, and optionally
4) distillatively removing volatile compounds, such as trichlorosilane or generally of monosilane compounds, distillatively removing hexachlorodisilane, to optionally obtain higher-boiling polychlorosilanes in the bottom product, which are preferably returned into the conversion/splitting reaction in the presence of hydrogen chloride.

Unconverted polychlorosilanes, in particular of general formula I, II and/or III, can be returned into the gas discharge, preferably the nonthermal plasma, if desired. To achieve complete conversion of the polychlorosilane, in particular octachlorotrisilane, into hexachlorodisilane it is possible to use a recycle having 1 to ∞, preferably having 1 to 100 cycles, preference being given to a low number of cycles in the range from 1 to 5 cycles, more preferably just one cycle is involved. Alternatively, the polychlorosilane which is not converted in the process can also be recycled and be introduced into the conversion in the nonthermal plasma together with freshly introduced polychlorosilane.

The hexachlorodisilane obtained by conversion in the nonthermal plasma is, aside from trichlorosilane, in a pure state in the resulting phase, whence it can be recovered in a high-purity state, in particular by distillative work-up. Ultrapure hexachlorodisilane, for example, can be isolated in this way from the other reaction products and any polychlorosilane reactants, see FIG. 1. No further compounds are detectable in the $^{29}$Si NMR spectrum besides the signal of hexachlorodisilane (δ=7.4±0.1 ppm, DMSO). The degree of contamination of the hexachlorodisilane with other metals and/or metal compounds is at least for the particular metal or the metal compound in the weight ppm range down to the weight ppt range, preferably in each case in the weight ppb range as specified hereinbelow, particular preference being given to a maximum contamination with other metals and/or metal compounds in the range from in each case 100 weight ppb down to 1 weight ppt, preferably from in each case 50 weight ppb down to 100 weight ppt. This is further achieved because, surprisingly, the foreign metal impurities present are complexed into higher polychlorosilanes.

The nonthermal plasma is generated in a plasma reactor and effectuates a transformation of matter, this transformation being referred to as "plasmatic" in the context of the present invention. Plasmas used for the purposes of the present invention are anisothermal. These plasmas are characterized by a high electron temperature $T_e \geq 10^4$ K and a relatively low gas temperature $T_G \leq 10^3$ K. The activation energy needed for the chemical processes is predominantly provided via electron impacts. Typical nonthermal plasmas can be generated, for example, by glow discharge, HF discharge, hollow cathode discharge or corona discharge. The working pressure at which the plasma treatment of the present invention is carried out is between 1 to 1000 $mbar_{abs.}$, preferably in the range from 1 to 800 $mbar_{abs.}$, more preferably in the range from 100 to 500 $mbar_{abs.}$, in particular in the range from 20 to 100 $mbar_{abs.}$, more preferably at around 50 $mbar_{abs.}$, while the phase to be treated, in particular a gaseous phase comprising polychlorosilane and hydrogen chloride, is preferably set to a temperature in the range from −40° C. to 400° C.

For the definition of nonthermal plasma and of homogeneous plasma catalysis, reference is made to the relevant technical literature, for example to "Plasmatechnik: Grundlagen und Anwendungen—Eine Einführung"; Autorenkollektiv, Carl Hanser Verlag, Munich/Vienna; 1984, ISBN 3-446-13627-4.

It is particularly preferable for the specific energy input to be between 0.1 and 10 Ws/cm². In a further preferred embodiment, the specific energy input is effected using phase-accurate measurement of instantaneous power at a bandwidth of at least 250 kHz, the measurement of instantaneous power being carried out in a coaxial reactor with 50 cm² discharge area. A coaxial reactor is preferably a tubular reactor, in particular a rotationally symmetrical tubular reactor.

The energy input to form the nonthermal plasma is preferably effected such that the plasma which forms provides very homogeneous conditions for reacting the polysilane with the hydrogen chloride, it being particularly preferable for the nonthermal plasma to be operated at a voltage at which the discharge is a glow discharge and covers the entire electrode area.

As stated above, the process step of reaction in the nonthermal plasma is followed by a process step of recovering the hexachlorodisilane, preferably the isolation of pure to ultrapure hexachlorodisilane. The process step of reaction by gas discharge, in particular the reaction in the nonthermal plasma, is followed with particular preference by a distillation of the resultant reaction product comprising hexachlorodisilane. The distillation preferably takes place in a vacuum, more preferably at between 10 and 100 $mbar_{abs.}$, and a pot temperature below 100° C., preferably around 80° C. $^{29}$Si NMR analysis is used to obtain a high-purity hexachlorodisilane free from polychlorosilanes or other silanes, i.e. a more than 99.999 wt % pure hexachlorodisilane is obtainable. The level of metallic impurities not in correspondence with silicon is below the detection limit of IPC-MS. The isolated ultrapure hexachlorodisilane is free from carbon, i.e. the contamination of the hexachlorodisilane with carbon is below 1 weight ppb, and the titanium content of the ultrapure hexachlorodisilane is below 10 weight ppm, preferably below 1 weight ppm.

The process of the present invention is preferably carried out by using octachlorotrisilane and hydrogen chloride in a molar ratio ranging from 10:1 to 1:10, in particular in a ratio ranging from 5:1 to 1:5, preferably in a molar ratio ranging from 3:1 to 1:2, and more preferably in a molar ratio of around 2:1 each plus/minus 0.5.

In one version of the process according to the present invention, the hexachlorodisilane obtained by the reaction is deposited on temperature-regulated surfaces of the apparatus for converting polychlorosilane, the surfaces preferably having a temperature in the range from 0 to 100° C.

The invention thus also provides a process wherein a polychlorosilane, preferably a high-purity polychlorosilane, is converted in the gas phase of a nonthermal plasma in the presence of hydrogen chloride, preferably with a molar polychlorosilane/hydrogen chloride ratio ranging from 4:1 to 1:1, in particular at around 2:1, into hexachlorodisilane and trichlorosilane. The reaction product obtained is preferably a hexachlorodisilane having a trichlorosilane content, the ratio between hexachlorodisilane and trichlorosilane in the reaction product preferably being about 1:1.

The invention thus also provides a process wherein a polychlorosilane, preferably a high-purity polychlorosilane, is converted in the gas phase of a nonthermal plasma in the presence of hydrogen chloride, preferably with a molar polychlorosilane/hydrogen chloride ratio ranging from 4:1 to 1:1, in particular at around 2:1, into hexachlorodisilane which is subsequently distilled to obtain an ultrapure hexachlorodisilane having a hexachlorodisilane content of not less than 99.999 wt %, the impurity content of the hexachlorodisilane preferably being aa. aluminium below 5 weight ppm or
   from 5 weight ppm to 0.0001 weight ppt,
   preferably from 3 weight ppm to 0.0001 weight ppt,
   more preferably from 0.8 weight ppm to 0.0001 weight ppt,
   furthermore preferably from 0.6 weight ppm to 0.0001 weight ppt,
   further more preferably from 0.1 weight ppm to 0.0001 weight ppt,
   yet even more preferably from 0.01 weight ppm to 0.0001 weight ppt,
   while the range from 1 weight ppb to 0.0001 weight ppt is yet even more preferred,
bb. boron from 5 to 0.0001 weight ppt,
   preferably in the range from 3 weight ppm to 0.0001 weight ppt,
   more preferably in the range from 10 weight ppb to 0.0001 weight ppt,
   yet even more preferably in the range from 1 weight ppb to 0.0001 weight ppt,
cc. calcium below 2 weight ppm,
   preferably from 2 weight ppm to 0.0001 weight ppt,
   further preferably from 0.3 weight ppm to 0.0001 weight ppt,
   further preferably from 0.01 weight ppm to 0.0001 weight ppt,
   more preferably from 1 weight ppb to 0.0001 weight ppt,
dd. iron from 10 weight ppm to 0.0001 weight ppt,
   preferably from 0.6 weight ppm to 0.0001 weight ppt, more preferably from 0.05 weight ppm to 0.0001 weight ppt,
yet more preferably from 0.01 weight ppm to 0.0001 weight ppt, and
yet even more preferably from 1 weight ppb to 0.0001 weight ppt,
ee. nickel from 5 weight ppm to 0.0001 weight ppt,
preferably from 0.5 weight ppm to 0.0001 weight ppt,
more preferably from 0.1 weight ppm to 0.0001 weight ppt,
even more preferably from 0.01 weight ppm to 0.0001 weight ppt, and
yet even more preferably from 1 weight ppb to 0.0001 weight ppt,
ff. phosphorus from 5 weight ppm to 0.0001 weight ppt,
preferably from 3 weight ppm to 0.0001 weight ppt,
more preferably from 10 weight ppb to 0.0001 weight ppt, and
even more preferably from 1 weight ppb to 0.0001 weight ppt,
gg. titanium from 1 weight ppm to 0.0001 weight ppt,
preferably from 0.6 weight ppm to 0.0001 weight ppt,
more preferably from 0.1 weight ppm to 0.0001 weight ppt,
even more preferably from 0.01 weight ppm to 0.0001 weight ppt, and
yet even more preferably from 1 weight ppb to 0.0001 weight ppt,
hh. zinc from 1 weight ppm to 0.0001 weight ppt,
preferably from 0.3 weight ppm to 0.0001 weight ppt,
more preferably from 0.1 weight ppm to 0.0001 weight ppt,
even more preferably from 0.01 weight ppm to 0.0001 weight ppt, and
yet even more preferably from 1 weight ppb to 0.0001 weight ppt, and
ii. carbon, with the proviso that carbon is present in a concentration which is added to the sum total of impurities aa. to hh. The value thus obtained is less than 100 weight ppm, preferably below 10 weight ppm and more preferably below 5 weight ppm.

The apparatus used for carrying out the process comprises a reactor for generating the nonthermal plasma, a collecting vessel and a column system for distillative work-up, the column system for continuous operation comprising two or more columns, in particular 3 or more columns. The columns may be provided to work up the overhead and/or bottom product of the first column. In one advantageous version, the column system may comprise four columns. One column is sufficient for batch operation. The columns are rectification columns, for example. The reactor is where the conversion of the polychlorosilanes takes place, while the reaction products, depending on their boiling point, can be enriched in a collecting vessel assigned to the reactor, or are directly removed from the apparatus via a column system assigned to the apparatus.

The apparatus may in addition to the reactor further utilize one or more further reactors, which are connected in series or parallel. According to the invention, at least one reactor forming part of the apparatus is an ozonizer. There is an immense advantage in the alternatively possible use of commercially available ozonizers in that the capital costs for the process of the present invention are very low. The reactors of the invention are advantageously equipped with glass tubes, in particular with quartz glass tubes, and the tubes are preferably in a parallel or coaxial arrangement and spaced apart by spacers made of an inert material. Teflon or glass is particularly useful as the inert material. It is known that the injected electron energy for the plasma discharge "E" is dependent on the product p.d. of pressure p and electrode separation d. For the process according to the present invention, the product of electrode spacing and pressure is generally in the range from 0.001 to 300 mm×bar, preferably from 0.05 to 100 mm×bar, more preferably 0.08 to 0.3 mm×bar, in particular 0.1 to 0.2 mm×bar. The discharge can be triggered by various types of AC voltages or pulsed voltages in the range from 1 to $10^6$ V. Similarly, the course of the voltage curve can be inter alia rectangular, trapezoidal, pulsed or an amalgam pieced together from individual time courses. Triggering voltages having a pulse shape are particularly suitable because they enable simultaneous formation of the discharge throughout the entire discharging space of the reactor. Pulse duration in pulsed operation depends on the gas system, it is preferably between 10 ns and 1 ms. Voltage amplitudes are preferably in the range from 10 Vp to 100 kVp, preferably 100 Vp to 10 Vp, in particular 50 to 5 Vp, in any one microsystem. The frequency of AC voltage can be between 10 MHz and 10 ns pulses (duty ratio 10:1) down to low frequencies in the range from 10 to 0.01 Hz. For example, an AC voltage having a frequency of 1.9 kHz and a peak-to-peak amplitude of 35 kV can be applied to the reactor. The specific energy input is between 0.1 to 10 Ws/cm$^2$.

The invention accordingly likewise provides a high-purity hexachlorodisilane obtained according to the process of the present invention with a hexachlorodisilane content of not less than 99.999 wt % and less than 100 weight ppm of impurities selected from boron, phosphorus, carbon and foreign metals, such as iron, nickel, calcium, aluminium, titanium, zinc.

The invention likewise provides a high-purity hexachlorodisilane having a hexachlorodisilane content of not less than 99.999 wt % and a content of impurities, in particular selected from boron, phosphorus and foreign metals, preferably with
aaa. aluminium below 5 weight ppm or
from 5 weight ppm to 0.0001 weight ppt,
preferably from 3 weight ppm to 0.0001 weight ppt,
more preferably from 0.8 weight ppm to 0.0001 weight ppt,
furthermore preferably from 0.6 weight ppm to 0.0001 weight ppt,
further more preferably from 0.1 weight ppm to 0.0001 weight ppt,
yet even more preferably from 0.01 weight ppm to 0.0001 weight ppt,
while the range from 1 weight ppb to 0.0001 weight ppt is yet even more preferred,
bbb. boron from 5 to 0.0001 weight ppt,
preferably in the range from 3 weight ppm to 0.0001 weight ppt,
more preferably in the range from 10 weight ppb to 0.0001 weight ppt,
yet even more preferably in the range from 1 weight ppb to 0.0001 weight ppt,
ccc. calcium below 2 weight ppm,
preferably from 2 weight ppm to 0.0001 weight ppt,
further preferably from 0.3 weight ppm to 0.0001 weight ppt,
further preferably from 0.01 weight ppm to 0.0001 weight ppt,
more preferably from 1 weight ppb to 0.0001 weight ppt,
ddd. iron from 10 weight ppm to 0.0001 weight ppt,
preferably from 0.6 weight ppm to 0.0001 weight ppt, more preferably from 0.05 weight ppm to 0.0001 weight ppt,
yet more preferably from 0.01 weight ppm to 0.0001 weight ppt, and
yet even more preferably from 1 weight ppb to 0.0001 weight ppt,
eee. nickel from 5 weight ppm to 0.0001 weight ppt,
preferably from 0.5 weight ppm to 0.0001 weight ppt,
more preferably from 0.1 weight ppm to 0.0001 weight ppt,
even more preferably from 0.01 weight ppm to 0.0001 weight ppt, and
yet even more preferably from 1 weight ppb to 0.0001 weight ppt,
fff. phosphorus from 5 weight ppm to 0.0001 weight ppt,
preferably from 3 weight ppm to 0.0001 weight ppt,
more preferably from 10 weight ppb to 0.0001 weight ppt, and
even more preferably from 1 weight ppb to 0.0001 weight ppt,
ggg. titanium from 1 weight ppm to 0.0001 weight ppt,
preferably from 0.6 weight ppm to 0.0001 weight ppt,
more preferably from 0.1 weight ppm to 0.0001 weight ppt,
even more preferably from 0.01 weight ppm to 0.0001 weight ppt, and
yet even more preferably from 1 weight ppb to 0.0001 weight ppt,
hhh. zinc from 1 weight ppm to 0.0001 weight ppt,
preferably from 0.3 weight ppm to 0.0001 weight ppt,
more preferably from 0.1 weight ppm to 0.0001 weight ppt,
even more preferably from 0.01 weight ppm to 0.0001 weight ppt, and
yet even more preferably from 1 weight ppb to 0.0001 weight ppt, and
iii. carbon, with the proviso that carbon is present in a concentration which is added to the sum total of impurities aaa. to hhh. The value thus obtained is less than 100 weight ppm, preferably below 10 weight ppm and more preferably below 5 weight ppm.

A foreign metal is any metal other than silicon.

The high-purity hexachlorodisilane obtained by the process according to the present invention is highly suitable for use in the production of silicon, silicon nitride, silicon oxynitride, silicon carbide, silicon oxycarbide or silicon oxide, in particular for production of layers of these materials and also for production of epitactic layers, preferably by low-temperature epitaxy. Hexachlorodisilane is very useful for low-temperature deposition of silicon layers. These layers are obtainable via chemical vapour deposition (CVD). The high-purity hexachlorodisilane obtained by the process according to the present invention is preferably also useful as a starting material for the production of high-purity disilane ($Si_2H_6$) or trisilane ($Si_3H_8$).

The invention likewise provides for the use of hydrogen halide, in particular hydrogen chloride, under the conditions of a gas discharge, preferably under the conditions in nonthermal plasma, to split polyhalosilanes, in particular polychlorosilanes, preferably polyperchlorosilanes, more preferably octachlorosilane.

In one preferred alternative, the process according to the present invention is carried out by the hexachlorodisilane formed from polychlorosilanes by (i) conversion in the nonthermal plasma being enriched in a collecting vessel of the apparatus for carrying out the process, for example in an apparatus bottom product which is subsequently subjected to a (ii) distillative work-up. Process steps (i) and/or (ii) can be carried out batchwise or continuously. A process regime wherein process steps (i) and (ii) are carried out in a continuous manner is particularly economical, it involves the polychlorosilanes and the hydrogen chloride being fed into the plasma reactor for gas phase treatment in nonthermal plasma in a continuous manner. The higher-boiling reaction products in the phase which forms are separated therefrom in a collecting vessel, preferably at about room temperature between 25 and 18° C. It can be advantageous to initially enrich the hexachlorodisilane in the collecting vessel at the start of the process, but also for unconverted polychlorosilanes to be returned into the reactor. This can be verified by samples being taken and analysed by FT-IR or NMR spectroscopy. The operation can thus also be monitored continuously by on-line analysis. As soon as hexachlorodisilane has reached an adequate concentration in the collecting vessel, i.e. the "pot", the distillative work-up, to separate off the hexachlorodisilane, can be carried out in a continuous or batchwise mode. As explained, one column is sufficient for a batchwise distillative work-up. To this end, hexachlorodisilane is removed in high or ultrahigh purity as the overhead of a column having a sufficient number of theoretical plates. The required purity can be verified by GC, IR, NMR, ICP-MS or by resistance measurement/GD-MS after silicon deposition.

According to the invention, the continuous work-up of the reaction/conversion products, such as hexachlorodisilane and trichlorosilane, can be effected in a column system comprising two or more columns, preferably in a system comprising 3 or more columns. This makes it possible, for example, for the hydrogen chloride gas (HCl) left unconverted by the reaction to be separated off as the overhead of a so-called low-boiler column, the first column, and for the mixture collected in the pot to be separated in its constituents by trichlorosilane ($HSiCl_3$) and hexachlorodisilane ($Si_2Cl_6$) being distillatively removed at the top of a second column and of a third column respectively, while a fourth column can optionally be added to separate off the unconverted polychlorosilane, such as octachlorotrisilane. This makes it possible for the mixture of reaction/conversion products which is obtained from the plasma reactor to be separated by rectification to obtain the reaction product hexachlorodisilane as well as trichlorosilane in the desired purity. The distillative work-up of the hexachlorodisilane can take place not only under atmospheric pressure but also under reduced pressure or superatmospheric pressure, in particular at a pressure between 1 to 1500 $mbar_{abs.}$. Preferred pressures lie between 40 to 250 $mbar_{abs.}$, in particular between 40 to 150 $mbar_{abs.}$, preferably between 40 to 100 $mbar_{abs.}$. The top of column temperature of the column for distillative work-up of the hexachlorodisilane in vacuo has a top of column temperature between 50 and 250° C., more particularly the vacuum setting being such that the temperature is between 50 and 150° C., more preferably between 50 and 110° C. The process products, which in any case are not very impure, can be isolated with very high content and in very high to ultrahigh purity by the distillative work-up.

The example which follows illustrates the process of the present invention.

EXAMPLE 1

Octachlorotrisilane was continuously transferred into the gas phase, mixed with hydrogen chloride gas in a molar ratio of 2:1 and passed at a pressure of 50 $mbar_{abs.}$ through a quartz glass reactor having a gas discharge sector. The gas discharge was operated using a substantially sinusoidal voltage curve and had on average a specific energy input of about 3 Ws/cm$^2$. The power was measured by the method, familiar to one skilled in the art, of multiplicative phase-accurate combining of instantaneous current I ($x=t_0$) with instantaneous voltage U($x=t_0$) into the instantaneous power value in the exemplary coaxial reactor with 50 cm$^2$ discharging area.

The values thus obtained vary appreciably, for example in response to transient discharges. In such cases, the 1 sigma value for the stochastic deviation of the energy input in Ws/cm$^2$ is in the range from 1 mWs/cm$^2$ to 10 Ws/cm$^2$.

The measuring instrument used had a 3 dB cut-off frequency of about 250 kHz. Instruments having a higher cut-off frequency can give rise to stochastic deviations other than those referred to above.

The gaseous reaction/conversion products obtained after passage through the gas discharge sector were condensed at 20° C. and subjected to a final distillation. The distillation was carried out batchwise in a distillation apparatus equipped with a 50 cm column pack with Sulzer metal packing.

Trichlorosilane was distilled off first. The pressure was then reduced to about 650 mbar$_{abs.}$ and pure hexachlorodisilane was distilled off at a base of column temperature of about 80° C. and a top of column temperature of around 70° C.

The $^{29}$Si NMR depicted in FIG. 1 only had a signal at δ=−7.4 ppm (in DMSO, 99.34 MHz 29Si NMR spectrum of hexachlorodisilane obtained by the process according to the present invention).

The invention claimed is:

1. A process for converting polychlorosilanes into hexachlorodisilane, comprising:
   mixing one or more trimeric polychlorosilanes or a trimeric polychlorosilane in a mixture with higher molecular weight polychlorosilanes with hydrogen chloride; and then,
   exposing the mixture of the hydrogen chloride and the one or more trimeric polychlorosilanes or the trimeric polychlorosilane in a mixture with higher molecular weight polychlorosilanes to a gas discharge to obtain a product comprising the hexachlorodisilane,
   wherein the trimeric polychlorosilane is octachlorotrisilane, and
   wherein octachlorotrisilane or octachlorotrisilane in a mixture with higher molecular weight polychlorosilanes and the hydrogen chloride are mixed such that a molar ratio of octachlorotrisilane/hydrogen chloride is from 3:1 to 2:1.

2. The process according to claim 1, wherein the gas discharge is a nonthermal plasma.

3. The process according to claim 1, wherein the polychlorosilanes are converted into the hexachlorodisilane in a vacuum.

4. The process according to claim 1, having a specific energy input of between 0.1 Ws/cm$^2$ and 10 Ws/cm$^2$.

5. The process according to claim 1, having a specific energy input that is effected using a phase-accurate measurement of instantaneous power at a band width of at least 250 kHz, wherein the measurement of instantaneous power is carried out in a coaxial reactor having a 50 cm$^2$ discharge area.

6. The process according to claim 1, further comprising: distilling the product after the exposing.

7. The process according to claim 6, wherein the product has a hexachlorodisilane content of not less than 99.999 wt %.

8. The process according to claim 1, wherein the one or more trimeric polychlorosilanes or the trimeric polychlorosilane in a mixture with higher molecular weight polychlorosilanes mixed with the hydrogen chloride and exposed to the gas discharge has less than 100 weight ppm of impurities.

9. The process according to claim 1, wherein the one or more trimeric polychlorosilanes or the trimeric polychlorosilane in a mixture with higher molecular weight polychlorosilanes mixed with the hydrogen chloride and exposed to the gas discharge is a polyperchlorosilane having less than 100 weight ppm of impurities.

10. The process according to claim 1, being carried out in a reactor that is equipped with one or more glass tubes.

* * * * *